(12) United States Patent
Ito et al.

(10) Patent No.: US 11,541,693 B2
(45) Date of Patent: Jan. 3, 2023

(54) TIRE

(71) Applicant: SUMITOMO RUBBER INDUSTRIES, LTD., Hyogo (JP)

(72) Inventors: Sho Ito, Hyogo (JP); Takafumi Hoshino, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 226 days.

(21) Appl. No.: 16/658,167

(22) Filed: Oct. 21, 2019

(65) Prior Publication Data

US 2020/0156416 A1 May 21, 2020

(30) Foreign Application Priority Data

Nov. 20, 2018 (JP) .............................. JP2018-217493
Nov. 20, 2018 (JP) .............................. JP2018-217494

(51) Int. Cl.
*B60C 11/11* (2006.01)
*B60C 11/13* (2006.01)
(Continued)

(52) U.S. Cl.
CPC ............ *B60C 11/11* (2013.01); *B60C 11/033* (2013.01); *B60C 11/1204* (2013.01); *B60C 11/125* (2013.01); *B60C 11/1259* (2013.01); *B60C 11/1307* (2013.01); *B60C 2011/0346* (2013.01); *B60C 2011/0362* (2013.01);
(Continued)

(58) Field of Classification Search
CPC ... B60C 11/11; B60C 11/125; B60C 11/1259; B60C 11/1307; B60C 2011/0346; B60C 2011/0362; B60C 2011/0365; B60C 2011/0367; B60C 11/0306; B60C 2011/133; B60C 2011/1338
See application file for complete search history.

(56) References Cited

U.S. PATENT DOCUMENTS 5,178,699 A * 1/1993 Kakumu ................. B60C 11/00
152/209.18
6,000,450 A * 12/1999 Kishimoto .............. B60C 11/00
152/209.1
(Continued)

FOREIGN PATENT DOCUMENTS

JP 2006160195 A * 6/2006
JP 2012-051484 * 3/2012
(Continued)

OTHER PUBLICATIONS

Kojima, JP-2006160195-A Machine Translation (Year: 2006).*
Kawakita, JP-5577430-B1 Machine Translation (Year: 2014).*
English machine translation of JP2012-051484. (Year: 2012).*

*Primary Examiner* — Robert C Dye
(74) *Attorney, Agent, or Firm* — JCIPRNET

(57) ABSTRACT

A tire includes, in a tread portion, a pair of shoulder main grooves, a crown region between the shoulder main grooves, and shoulder regions disposed outside of the shoulder main grooves in a tire axial direction. Land ratios of the crown region and the shoulder regions are respectively 40%-60%. In the crown region, a plurality of middle blocks are arranged on both sides of a tire equator, and each middle block has a longitudinal shape in which a length in the tire circumferential direction is larger than a length in the tire axial direction.

19 Claims, 9 Drawing Sheets

(51) Int. Cl.
*B60C 11/12* (2006.01)
*B60C 11/03* (2006.01)

(52) U.S. Cl.
CPC ........... *B60C 2011/0365* (2013.01); *B60C 2011/0367* (2013.01); *B60C 2011/1209* (2013.01); *B60C 2011/1213* (2013.01); *B60C 2200/14* (2013.01)

(56) References Cited

U.S. PATENT DOCUMENTS

| | | | | |
|---|---|---|---|---|
| 6,530,405 | B1 * | 3/2003 | Brown | B60C 11/01 152/209.16 |
| 9,731,560 | B2 * | 8/2017 | Takano | B60C 11/0309 |
| 2008/0053585 | A1 * | 3/2008 | Ohara | B60C 11/0306 152/209.25 |
| 2010/0096055 | A1 * | 4/2010 | Shibano | B60C 11/1369 152/209.25 |
| 2014/0158261 | A1 * | 6/2014 | Takahashi | B60C 11/0306 152/209.8 |
| 2016/0059638 | A1 * | 3/2016 | Matsuda | B60C 11/0309 152/209.25 |
| 2016/0332488 | A1 * | 11/2016 | Araki | B60C 11/0311 |
| 2021/0362550 | A1 * | 11/2021 | Sakamoto | B60C 11/1625 |

FOREIGN PATENT DOCUMENTS

| | | | | |
|---|---|---|---|---|
| JP | 5577430 | B1 * | 8/2014 | ......... B60C 11/0309 |
| JP | 2017213926 | | 12/2017 | |

\* cited by examiner

TIRE

CROSS-REFERENCE TO RELATED APPLICATION

This application claims the priority benefits of Japan Patent Application No. 2018-217493, filed on Nov. 20, 2018, and Japan Patent Application No. 2018-217494, filed on Nov. 20, 2018. The entirety of each of the above-mentioned patent applications is hereby incorporated by reference herein and made a part of this specification.

BACKGROUND

Technical Field

The disclosure relates to a tire suitable for off-road (rough terrain) driving.

Related Art

In a tire intended for off-road driving, a method is employed in which traction performance is improved by increasing groove volume in a ground contact surface to make it easy to bite mud, sand, snow and the like (hereinafter referred to as mud and the like) or increasing edge components perpendicular to a travel direction to increase a scratch effect. More specifically, an approach of thickening lug grooves extending in the tire axial direction or increasing the number of the lug grooves or an approach of increasing sipes extending in the tire axial direction is used (for example, see patent literature 1).

However, according to the above approaches, there is a risk that rigidity of a tread portion in a tire circumferential direction is reduced and anti-wear performance deteriorates. Particularly, in a tire mounted on a so-called pickup vehicle, rear wheels are in a state of high internal pressure and low load, and the occurrence of uneven wear in a crown region becomes remarkable.

LITERATURE OF RELATED ART

Patent Literature

[Patent literature 1] Japanese Laid-Open No. 2017-213926

The disclosure provides a tire capable of improving off-road traction performance while maintaining anti-wear performance.

SUMMARY

The disclosure is a tire including a tread portion, and the tread portion includes: a pair of shoulder main grooves which is disposed to continuously extend the sides closest to tread ground ends in a tire circumferential direction and clamp a tire equator, a crown region between the pair of shoulder main grooves, and shoulder regions disposed outside of the shoulder main grooves in a tire axial direction; land ratios of the crown region and the shoulder regions are respectively 40%-60%; in the crown region, a plurality of middle blocks are arranged on both sides of the tire equator; and each middle block has a longitudinal shape in which a length $L2$ in the tire circumferential direction is larger than a length $L1$ in the tire axial direction.

DESCRIPTION OF THE EMBODIMENTS

Figure 1:
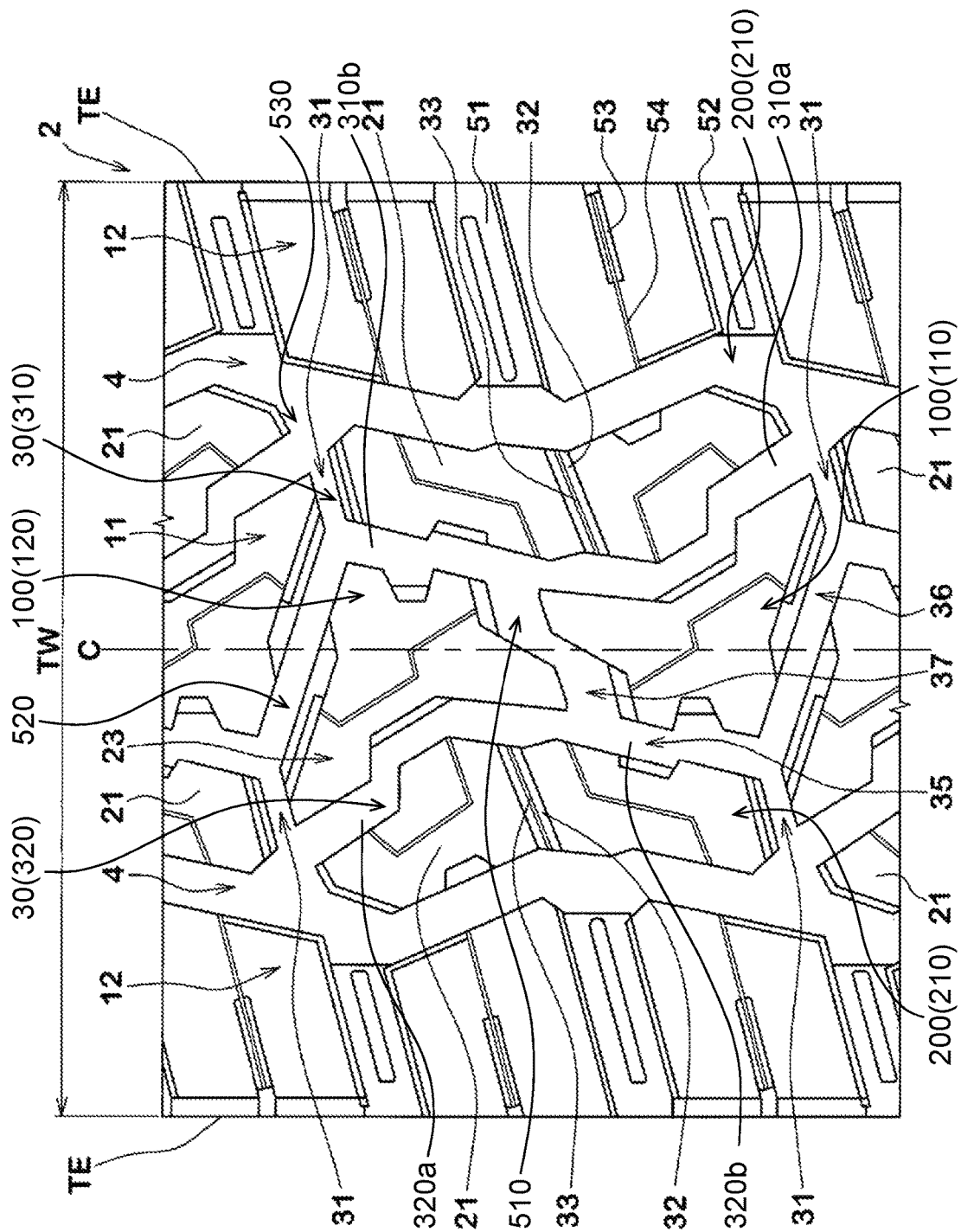
FIG. 1 is a developed view of a tread portion showing one embodiment of a tire of the disclosure.

In the tire of the disclosure, desirably, a ratio $L2/L1$ of the length $L2$ to the length $L1$ of each middle block is 2.0-4.0.

In the tire of the disclosure, desirably, the middle blocks are lined up in the tire circumferential direction via a middle transverse groove; a shallow groove crossing each middle block is formed in each middle block; and the shallow groove is smaller in depth than the middle transverse groove.

In the tire of the disclosure, desirably, a depth of the shallow groove is 40%-60% of a depth of the middle transverse groove.

In the tire of the disclosure, desirably, a groove width of the shallow groove is 4%-6% of the length $L2$ of each middle block in the tire circumferential direction.

In the tire of the disclosure, desirably, a groove bottom sipe extending along the shallow groove is arranged at the groove bottom of the shallow groove.

In the tire of the disclosure, desirably, a depth of the groove bottom sipe is 40%-60% of the depth of the shallow groove.

In the tire of the disclosure, desirably, at least one of two end surfaces of each middle block located at both ends in the tire circumferential direction has a stepped portion in which the height decreases in step from the block tread toward the groove bottom of the middle transverse groove.

In the tire of the disclosure, desirably, the stepped portion has two step portions between the block tread and the groove bottom of the middle transverse groove.

In the tire of the disclosure, desirably, each middle block is bent to be convex toward the tire equator side.

In the tire of the disclosure, desirably, in the crown region, a plurality of crown blocks are arranged between the middle blocks; and a ratio $L4/L3$ of a length $L4$ of each crown block in the tire circumferential direction to a length $L3$ of each crown block in the tire axial direction is 0.85-1.15.

In the tire of the disclosure, desirably, a pair of the crown blocks is disposed between a pair of the middle blocks adjacent in the tire axial direction.

In the tire of the disclosure, desirably, a pair of center main grooves disposed on both sides of the tire equator and continuously extending in a zigzag shape in the tire circumferential direction, and a plurality of crown blocks partitioned between the pair of center main grooves are formed in the tread portion; the crown block includes a first crown block having a first internal corner portion in which an outer end edge on one side in the tire axial direction is concave to the inner side in the tire axial direction, and a first external corner portion in which an outer end edge on the other side in the tire axial direction is convex to the outer side in the tire axial direction; and a first stepped region having at least one step in which the height decreases in step from the block tread toward the groove bottom of the center main groove is arranged in the first internal corner portion.

In the tire of the disclosure, desirably, the crown block includes a second crown block having a second internal corner portion in which the outer end edge on one side in the tire axial direction is concave to the inner side in the tire axial direction, and a second external corner portion in which the outer end edge on the other side in the tire axial direction is convex to the outer side in the tire axial direction; and a second stepped region having at least one step in which the height decreases in step from the block tread toward the groove bottom of the center main groove is arranged in the second internal corner portion.

In the tire of the disclosure, desirably, the step number of the first stepped region and the second stepped region is one.

In the tire of the disclosure, desirably, the height of one step of the first stepped region and the second stepped region from the groove bottom of the center main groove is 30%-50% of the maximum groove depth of the center main groove.

In the tire of the disclosure, desirably, a plurality of middle blocks are formed outside of each of the pair of center main grooves in the tire axial direction in the tread portion; the middle block includes a first middle block having a third external corner portion in which the inner end edge in the tire axial direction is convex to the inner side in the tire axial direction in a position facing the first internal corner portion with the center main groove interposed therebetween, and a third internal corner portion in which the inner end edge in the tire axial direction is concave to the outer side in the tire axial direction in a position facing the second external corner portion with the center main groove interposed therebetween; and a third stepped region having at least one step in which the height decreases in step from the block tread toward the groove bottom of the center main groove is arranged in the third internal corner portion.

In the tire of the disclosure, desirably, the middle block includes a second middle block having a fourth external corner portion in which the inner end edge in the tire axial direction is convex to the inner side in the tire axial direction in a position facing the second internal corner portion with the center main groove interposed therebetween, and a fourth internal corner portion in which the inner end edge in the tire axial direction is concave to the outer side in the tire axial direction in a position facing the first external corner portion with the center main groove interposed therebetween; and a fourth stepped region having at least one step in which the height decreases in step from the block tread toward the groove bottom of the center main groove is arranged in the fourth internal corner portion.

In the tire of the disclosure, desirably, the step number of the third stepped region and the fourth stepped region is one.

In the tire of the disclosure, desirably, the height of one step of the third stepped region and the fourth stepped region from the groove bottom of the center main groove is 30%-50% of the maximum groove depth of the center main groove.

The tire of the disclosure includes, in a tread portion, a pair of shoulder main grooves, a crown region between the pair of shoulder main grooves, and shoulder regions disposed outside of the shoulder main grooves in the tire axial direction; and land ratios of the crown region and the shoulder regions are respectively 40%-60%. Accordingly, anti-wear performance and off-road traction performance can be easily balanced. In the crown region, a plurality of middle blocks are arranged on both sides of a tire equator, and each middle block has a longitudinal shape in which a length L2 in the tire circumferential direction is larger than a length L1 in the tire axial direction. Accordingly, rigidity of the crown region in the tire circumferential direction is increased, and the anti-wear performance is improved.

One embodiment of the disclosure is described below with reference to the drawings.

FIG. 1 is a developed view of a tread portion 2 of a tire of the embodiment. As shown in FIG. 1, the tire of the embodiment is equipped with the tread portion 2 and includes a pair of shoulder main grooves 4, a crown region 11, and a pair of shoulder regions 12 in the tread portion 2.

The shoulder main grooves 4 are disposed to continuously extend the sides closest to tread ground ends TE in the tire circumferential direction and clamp a tire equator C.

The tread ground ends TE refer to tread ground ends of the outmost side in the tire axial direction when the tire of a normal state is applied with a normal load and grounded to a plane with a camber angle of 0°. Here, the normal state refers to an unloaded state in which the tire is assembled in a normal rim (not shown) and a normal internal pressure is filled. Hereinafter, the dimension and the like of each part of the tire are values measured in this normal state unless otherwise mentioned. In the normal state, a distance between the tread ground ends TE, TE in the tire axial direction is defined as a tread ground width TW.

The "normal rim" refers to, in a standard system including standards on which the tire is based, the rim to which the standard is determined for each tire. For example, the "normal rim" is the "Standard Rim" in JATMA (Japan Automobile Tire Manufacturers Association), the "Design Rim" in TRA (Tire and Rim Association), and the "Measuring Rim" in ETRTO (European Tire and Rim Technical Organization).

The "normal internal pressure" refers to, in a standard system including standards on which the tire is based, the air pressure to which respective standard is determined for each tire. The "normal internal pressure" is the "MAXIMUM AIR PRESSURE" in JATMA, the maximum value described in Table "TIRE LOAD LIMITS AT VARIOUS COLD INFLATION PRESSURES" in TRA, and the "INFLATION PRESSURE" in ETRTO. When the tire is used in a passenger car, the normal internal pressure is, for example, 180 kPa.

The "normal load" refers to, in a standard system including standards on which the tire is based, the load to which respective standard is determined for each tire. The "normal load" is the "MAXIMUM LOAD CAPACITY" in JATMA, the maximum value described in Table "TIRE LOAD LIMITS AT VARIOUS COLD INFLATION PRESSURES" in TRA, and the "LOAD CAPACITY" in ETRTO. When the tire is used in a passenger car, the normal load is, for example, load equivalent to 88% of the aforementioned load.

The shoulder main grooves 4 of the embodiment extend in a zigzag shape in the tire circumferential direction. The width of the shoulder main grooves 4 can be variously determined according to convention. For example, in the tire of the embodiment, the width of the shoulder main grooves 4 is desirably 4.0%-8.5% of the tread ground width TW.

The shoulder main grooves 4 are desirably formed in a region of 40%-70% of the tread ground width TW from the tire equator C toward the outer side in the tire axial direction. By forming the shoulder main grooves 4 in a region of 40% or more of the tread ground width TW from the tire equator C, the anti-wear performance of the crown region 11 can be improved. By forming the shoulder main grooves 4 in a region of 70% or less of the tread ground width TW from the tire equator C, the uneven wear of the shoulder regions 12 can be suppressed.

The crown region 11 is disposed between the pair of shoulder main grooves 4. That is, the crown region 11 is disposed inside of the shoulder main grooves 4 in the tire axial direction. A land ratio of the crown region 11 is 40%-60%.

In this specification, the land ratio refers to a ratio (S/Sa) of a surface area S of a tread in each region to a surface area Sa of a virtual tread obtained by filling all grooves in each region.

By the land ratio of the crown region 11 being 40% or more, the rigidity of the crown region 11 is sufficiently secured, and the anti-wear performance is improved. By the land ratio of the crown region 11 being 60% or less, the volume of biting mud and the like in the crown region 11 increases during off-road driving, and thus the traction performance is improved.

The shoulder regions 12 are arranged outside of the shoulder main grooves 4 in the tire axial direction. The land ratio of the shoulder regions 12 is 40%-60%.

By the land ratio of the shoulder regions 12 being 40% or more, the rigidity of the shoulder regions 12 is sufficiently secured, and the anti-wear performance is improved. By the land ratio of the shoulder regions 12 being 60% or less, the volume of biting mud and the like in the shoulder regions 12 increases during off-road driving, and thus the traction performance is improved.

That is, by the land ratios of the crown region 11 and the shoulder regions 12 being 40%-60% respectively, the rigidity and the groove volume of the tread portion 2 in each region are sufficiently secured, and the anti-wear performance and the off-road traction performance are easily balanced.

The crown region 11 is desirably formed in a region of 31% or less of the tread ground width TW from the tire equator C. By the crown region 11 being formed in the region of 31% or less of the tread ground width TW from the tire equator C, the volume the shoulder regions 12 is easily secured and the uneven wear of the shoulder regions 12 is suppressed.

Figure 2:
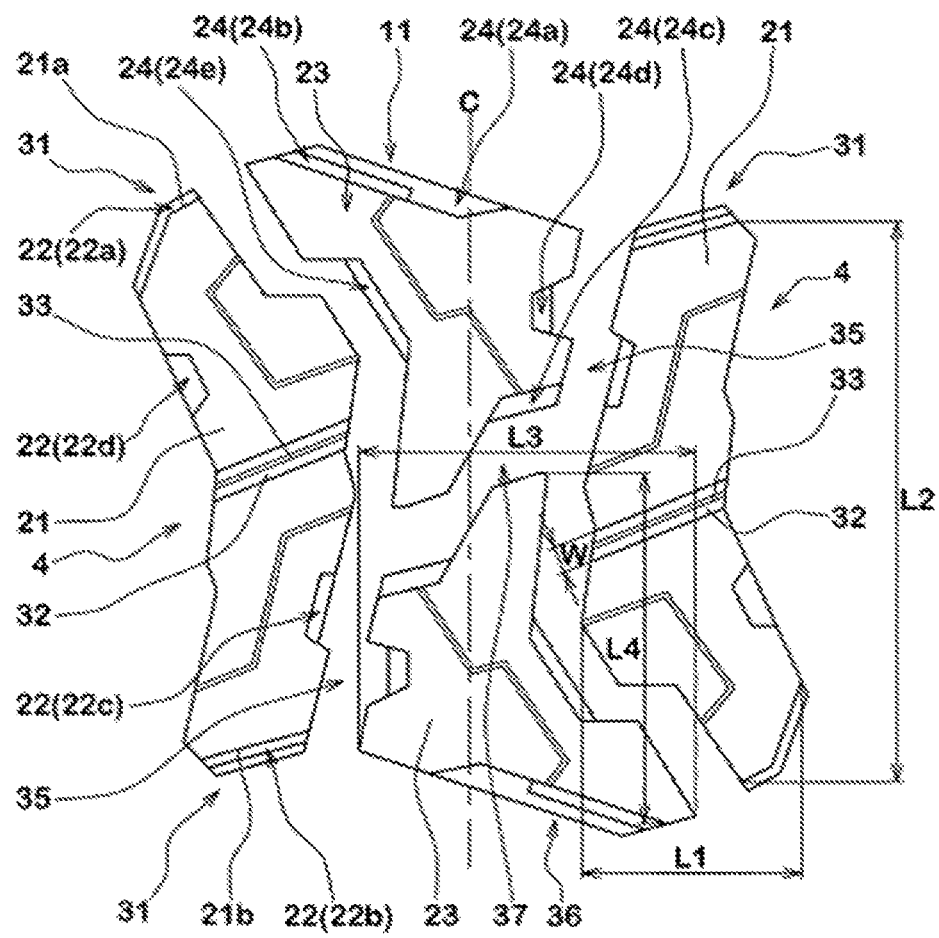
FIG. 2 is a developed view of a crown region of FIG. 1.

FIG. 2 shows the crown region 11. Middle blocks 21 are arranged in the crown region 11. The respective middle blocks 21 are arranged on both sides of the tire equator C. The middle blocks 21 are lined up in the tire circumferential direction via middle transverse grooves 31 (see FIG. 1).

Each middle block 21 has a longitudinal shape in which a length L2 in the tire circumferential direction is larger than a length L1 in the tire axial direction. Accordingly, the rigidity of the crown region 11 in the tire circumferential direction is increased, and the anti-wear performance is improved.

Here, the length L1 of the middle block 21 in the tire axial direction is measured by a distance in the tire axial direction from an inner end of the tread of the middle block 21 in the tire axial direction to an outer end of the tread of the middle block 21 in the tire axial direction. The length L2 of the middle block 21 in the tire circumferential direction is measured by a distance in the tire circumferential direction from one end of the tread of the middle block 21 in the tire circumferential direction to the other end of the tread of the middle block 21 in the tire circumferential direction (the same applies to a length L3 of a crown block 23 in the tire axial direction and a length L4 of the crown block 23 in the tire circumferential direction which are described later).

A ratio L2/L1 of the length of each middle block 21 is desirably 2.0-4.0. By the ratio L2/L1 being 2.0 or more, the rigidity of the middle block 21 in the tire circumferential direction is easily increased and the wear of the middle block 21 is suppressed. By the ratio L2/L1 being 4.0 or less, the number of the middle transverse grooves 31 is easily secured. Accordingly, the volume of biting mud and the like in the crown region 11 increases, and thus the off-road traction performance can be improved.

A shallow groove 32 is formed in each middle block 21. The shallow groove 32 crosses the middle block 21 in the tire axial direction. By forming the shallow groove 32 in the middle block 21, the off-road traction performance can be further improved.

The shallow groove 32 is smaller in depth than the middle transverse groove 31. Accordingly, the rigidity of the middle block 21 in the tire circumferential direction is easily secured, and the anti-wear performance is improved.

The depth of the shallow groove 32 is desirably 40%-60% of the depth of the middle transverse groove 31. By the depth of the shallow groove 32 being 40% or more of the depth of the middle transverse groove 31, the volume of the shallow groove 32 is sufficiently secured, and thus the off-road traction performance can be improved. By the depth of the shallow groove 32 being 60% or less of the depth of the middle transverse groove 31, the rigidity of the middle block 21 in the tire circumferential direction is sufficiently secured, and the anti-wear performance is improved.

A groove width W of the shallow groove 32 is desirably 4%-6% of the length L2 of the middle block 21 in the tire circumferential direction. By the groove width W of the shallow groove 32 being 4% or more of the length L2, the volume of the shallow groove 32 is sufficiently secured, and thus the off-road traction performance can be improved. By the groove width W of the shallow groove 32 being 6% or less of the length L2, the rigidity of the middle block 21 in the tire circumferential direction is sufficiently secured, and the anti-wear performance is improved.

The shallow groove 32 is formed at the approximate center in the circumferential direction of the middle block 21. Accordingly, mud and the like easily bite into the shallow groove 32, and the off-road traction performance can be improved. In addition, the rigidity of the middle block 21 in the tire circumferential direction is made uniform, and the uneven wear of the middle block 21 is suppressed.

The shallow groove 32 is formed in a linear shape that is inclined with respect to the tire axial direction. Accordingly, the off-road traction performance can be improved, and a powerful design is given to the tread portion 2.

At the groove bottom of the shallow groove 32 of the embodiment, a groove bottom sipe 33 extending along the shallow groove 32 is arranged. Here, the "sipe" refers to a cut with a width of 2 mm or less (preferably 1.5 mm or less), and is closed by a ground condition in which a normal load is applied on the tire, that is, high ground pressure on the tread. Due to the groove bottom sipe 33, edge components of the middle block 21 in the tire axial direction increase, and the traction performance is improved.

The depth of the groove bottom sipe 33 is desirably 40%-60% of the depth of the shallow groove 32. The depth of the groove bottom sipe 33 is measured using the groove bottom of the shallow groove 32 as a reference plane. By the depth of the groove bottom sipe 33 being 40% or more of the depth of the shallow groove 32, the groove bottom sipe 33 remains even after the middle period of wear, and improvement of the traction performance due to the above edge components is expected. By the depth of the groove bottom sipe 33 being 60% or less of the depth of the shallow groove 32, the rigidity of the middle block 21 in the tire circumferential direction is sufficiently secured and the anti-wear performance is improved.

A stepped portion 22 is formed on the end surface of each middle block 21. The stepped portion 22 is arranged on two end surfaces 21a, 21b located at both ends of the middle block 21 in the tire circumferential direction. The stepped portion 22 may also be arranged at least one of the end surfaces 21a, 21b.

The stepped portion 22 has a stepped portion 22a arranged on the end surface 21a and a stepped portion 22b arranged on the end surface 21b.

Figure 3:
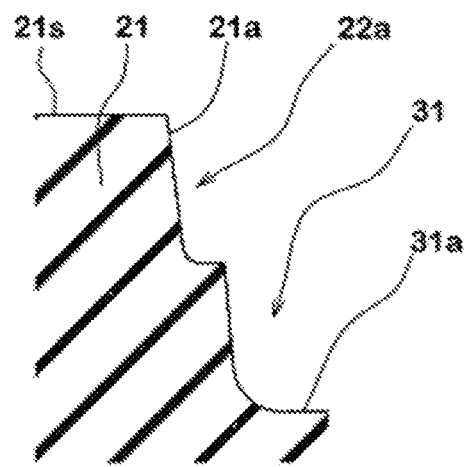
FIG. 3 is a cross-sectional view including one end surface of a middle block of FIG. 2 in the tire circumferential direction.
Figure 4:
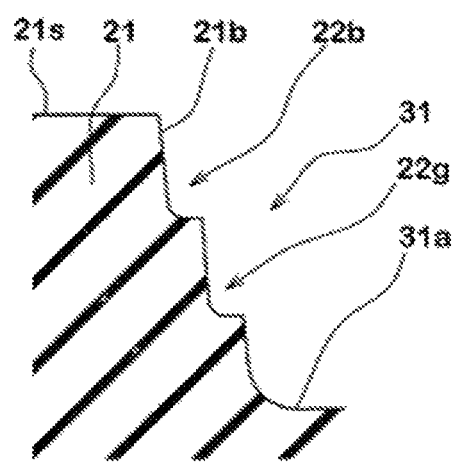
FIG. 4 is a cross-sectional view including the other end surface of the middle block of FIG. 2 in the tire circumferential direction.

FIG. 3 is a cross section of the middle block 21 including the stepped portion 22a, and FIG. 4 is a cross section of the middle block 21 including the stepped portion 22b. The stepped portion 22 is formed in a manner that the height decreases in step (steppedly) from a block tread 21s toward a groove bottom 31a of the middle transverse groove 31.

As shown in FIG. 3, the stepped portion 22a has one step portion between the block tread 21s and the groove bottom 31a of the middle transverse groove 31. Due to the stepped portion 22a, the edge components of the middle block 21 in the tire axial direction increase, and the traction performance is improved.

As shown in FIG. 4, the stepped portion 22b has two step portions between the block tread 21s and the groove bottom 31a of the middle transverse groove 31. Due to the stepped portion 22b, the edge components of the middle block 21 in the tire axial direction further increase, and the traction performance is improved.

The number of the step portions in the stepped portion 22 is desirably two or less. Due to the stepped portion 22, the volume of a stepped groove portion 22g (see FIG. 4) is sufficiently secured, and the traction performance is improved.

The stepped portion 22 of the embodiment desirably has a stepped portion 22c and a stepped portion 22d. The stepped portion 22c is partially arranged on the end surface of the middle block 21 located inside of the middle block 21 in the tire axial direction. The stepped portion 22d is partially arranged on the end surface of the middle block 21 located outside of the middle block 21 in the tire axial direction. The stepped portion 22c and the stepped portion 22d have one step portion toward the outer side of the middle block 21 in the tire axial direction. The traction performance is improved due to the stepped portion 22c and the stepped portion 22d.

As shown in FIG. 2, each middle block 21 is bent to be convex toward the tire equator C side. Due to the middle blocks 21, the off-road traction performance is improved.

The crown region 11 has a plurality of crown blocks 23. In the embodiment, a pair of crown blocks 23 adjacent in the tire circumferential direction is arranged between a pair of middle blocks 21 adjacent in the tire axial direction. The crown blocks 23 adjacent in the tire circumferential direction are bent in mutually opposite directions. Due to the crown blocks 23, the off-road traction performance is improved.

A ratio L4/L3 of the length L4 of each crown block 23 in the tire circumferential direction to the length L3 of each crown block 23 in the tire axial direction is desirably 0.85-1.15. Due to this crown block 23, the rigidity in the tire circumferential direction and the edge components in the tire axial direction are well balanced, and the anti-wear performance and the off-road traction performance are improved with a good balance.

Desirably, a stepped portion 24 is formed on the end surface of each crown block 23. The stepped portion 24 has a stepped portion 24a, a stepped portion 24b and a stepped portion 24c arranged on both sides of the crown block 23 in the tire circumferential direction, and a stepped portion 24d and a stepped portion 24e arranged on both sides of the crown block 23 in the tire axial direction.

The stepped portions 24a, 24b are partially arranged on the end surface of the crown block 23 located on one side in the tire circumferential direction. The stepped portion 24a has one step portion from the tread of the crown block 23 toward the outer side in the tire circumferential direction. The stepped portion 24b has two step portions from the tread of the crown block 23 toward the outer side in the tire circumferential direction. The stepped portion 24a and the stepped portion 24b are continuously disposed in the tire axial direction.

The stepped portion 24c is partially arranged on the end surface of the crown block 23 located on the other side in the tire circumferential direction. The stepped portion 24c has one step portion from the tread of the crown block 23 toward the outer side in the tire circumferential direction.

The stepped portion 24d is partially arranged at the center of the end surface of the crown block 23 located on one side in the tire axial direction. The stepped portion 24e is partially arranged at the center of the end surface of the crown block 23 located on the other side in the tire axial direction. The stepped portion 24d and the stepped portion 24e have one step portion from the tread of the crown block 23 toward the outer side in the tire axial direction.

The traction performance is improved due to the stepped portions 24a, 24b, 24c, 24d and 24e.

As shown in FIGS. 1, 2, the middle block 21 and the crown block 23 are partitioned by crown grooves 35, 36, 37 and the like that extend the crown region 11 in a zigzag shape. Accordingly, the land ratio of the crown region 11 is 40%-60% as described above.

Figure 5:
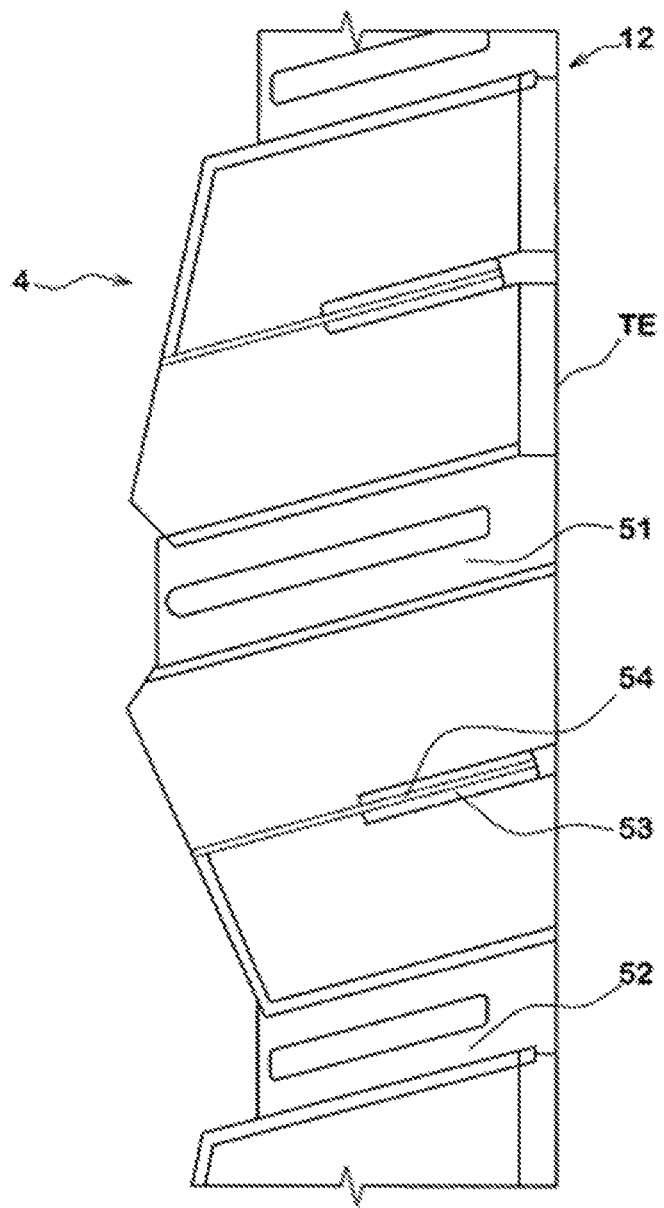
FIG. 5 is a developed view of a shoulder region of FIG. 1.

FIG. 5 shows a shoulder region 12. In the shoulder region 12, a plurality of shoulder transverse grooves 51 and shoulder transverse grooves 52 that connect the tread ground ends TE and the shoulder main grooves 4 are formed. In addition, in the shoulder region 12, shoulder transverse grooves 53 extending from the tread ground ends TE toward the inner side in the tire axial direction and having inner ends in the shoulder region 12 and groove bottom sipes 54 formed at the groove bottom of the shoulder transverse grooves 53 and the like are formed. The groove bottom sipes 54 extend to the shoulder main grooves 4. Accordingly, the land ratio of the shoulder region 12 is 40%-60% as described above.

The tire of the disclosure is described above in detail, but the disclosure is not limited to the above specific embodiment, and is changed into various aspects and implemented.

EXAMPLES

The tires having a basic pattern of FIG. 1 and a size of 35×12.50R20LT is produced experimentally based on specifications of Table 1, and the anti-wear performance and the traction performance of each sample tire are tested. The depth of the middle transverse groove is 14.6 mm, the depth of the shallow groove is 7.3 mm, and the depth of the groove bottom sipe is 3.7 mm. The test method is as follows.

<Anti-Wear Performance>

Each sample tire assembled into a rim of 20×10 J is filled with an internal pressure of 450 kPa and mounted on a 4WD pickup truck vehicle with an emission volume of 3500 cc, and the groove depth and the presence or absence of uneven wear after driving for 100,000 km on a paved road surface are comprehensively evaluated by a tester. The result is represented by an index taking Example 1 as 100, and the higher the number is, the more excellent the anti-wear performance is.

<Traction Performance>

Each sample tire assembled into a rim of 20×10 J is filled with an internal pressure of 450 kPa and mounted on the above vehicle, and respectively drives for 100 km on sandy road and muddy road. Feeling of sudden acceleration is evaluated by sensuality of the tester. The result is represented by a score taking Example 1 as 100, and the higher the number is, the more excellent the traction performance is.

TABLE 1

|  | Comparative example 1 | Comparative example 2 | Comparative example 3 | Example 1 | Example 2 | Example 3 |
|---|---|---|---|---|---|---|
| Land ratio of crown region (%) | 30 | 70 | 50 | 50 | 40 | 60 |
| Land ratio of shoulder region (%) | 30 | 70 | 50 | 50 | 40 | 60 |
| L2/L1 | 0.5 | 0.5 | 0.5 | 3.0 | 3.0 | 3.0 |
| Shallow groove | No | No | No | Yes | Yes | Yes |
| W/L2 (%) | — | — | — | 5 | 5 | 5 |
| Groove bottom sipe | No | No | No | Yes | Yes | Yes |
| Stepped portion (two step portions) | No | No | No | Yes | Yes | Yes |
| L4/L3 | 1.0 | 1.0 | 1.0 | 1.0 | 1.0 | 1.0 |
| Anti-wear performance | 75 | 110 | 80 | 100 | 90 | 110 |
| Traction performance | 110 | 75 | 110 | 100 | 110 | 90 |

|  | Example 4 | Example 5 | Example 6 | Example 7 | Example 8 | Example 9 |
|---|---|---|---|---|---|---|
| Land ratio of crown region (%) | 50 | 50 | 50 | 50 | 50 | 50 |
| Land ratio of shoulder region (%) | 50 | 50 | 50 | 50 | 50 | 50 |
| L2/L1 | 1.5 | 2.0 | 4.0 | 5.0 | 3.0 | 3.0 |
| Shallow groove | Yes | Yes | Yes | Yes | No | Yes |
| W/L2 (%) | 5 | 5 | 5 | 5 | — | 3 |
| Groove bottom sipe | Yes | Yes | Yes | Yes | No | Yes |
| Stepped portion (two step portions) | Yes | Yes | Yes | Yes | Yes | Yes |
| L4/L3 | 1.0 | 1.0 | 1.0 | 1.0 | 1.0 | 1.0 |
| Anti-wear performance | 93 | 95 | 105 | 107 | 107 | 105 |
| Traction performance | 107 | 105 | 95 | 93 | 93 | 95 |

|  | Example 10 | Example 11 | Example 12 | Example 13 | Example 14 | Example 15 |
|---|---|---|---|---|---|---|
| Land ratio of crown region (%) | 50 | 50 | 50 | 50 | 50 | 50 |
| Land ratio of shoulder region (%) | 50 | 50 | 50 | 50 | 50 | 50 |
| L2/L1 | 3.0 | 3.0 | 3.0 | 3.0 | 3.0 | 3.0 |
| Shallow groove | Yes | Yes | Yes | Yes | Yes | Yes |
| W/L2 (%) | 4 | 6 | 7 | 5 | 5 | 5 |
| Groove bottom sipe | Yes | Yes | Yes | No | Yes | Yes |
| Stepped portion (two step portions) | Yes | Yes | Yes | Yes | No | Yes |
| L4/L3 | 1.0 | 1.0 | 1.0 | 1.0 | 1.0 | 0.7 |
| Anti-wear performance | 103 | 97 | 95 | 103 | 103 | 95 |
| Traction performance | 97 | 103 | 105 | 97 | 97 | 105 |

TABLE 1-continued

|  | Example 16 | Example 17 | Example 18 |
|---|---|---|---|
| Land ratio of crown region (%) | 50 | 50 | 50 |
| Land ratio of shoulder region (%) | 50 | 50 | 50 |
| L2/L1 | 3.0 | 3.0 | 3.0 |
| Shallow groove | Yes | Yes | Yes |
| W/L2 (%) | 5 | 5 | 5 |
| Groove bottom sipe | Yes | Yes | Yes |
| Stepped portion (two step portions) | Yes | Yes | Yes |
| L4/L3 | 0.85 | 1.15 | 1.3 |
| Anti-wear performance | 97 | 103 | 105 |
| Traction performance | 103 | 97 | 95 |

As is clear from Table 1, it can be confirmed that the anti-wear performance and the traction performance are significantly improved with a good balance in the tire of examples compared with comparative examples.

In addition, as shown in FIG. 1, a pair of center main grooves 30 disposed on both sides of the tire equator C and a plurality of crown blocks 100 partitioned between the pair of center main grooves 30 are further formed in the tread portion 2. The center main grooves 30 include a center main groove 310 of one side (right side in FIG. 1) with respect to the tire equator C and a center main groove 320 of the other side (left side in FIG. 1) with respect to the tire equator C.

The center main groove 310 is a circumferential groove that continuously extends in a zigzag shape in the tire circumferential direction. That is, the center main groove 310 includes a first inclined portion 310a that is inclined to one side (right downward direction in FIG. 1) in the tire axial direction and a second inclined portion 310b that is inclined to the other side (left downward direction in FIG. 1) in the tire axial direction.

Similarly, the center main groove 320 is a circumferential groove that continuously extends in a zigzag shape in the tire circumferential direction. That is, the center main groove 320 includes a first inclined portion 320a that is inclined to one side in the tire axial direction and a second inclined portion 320b that is inclined to the other side in the tire axial direction.

The first inclined portion 310a of the center main groove 310 and the second inclined portion 320b of the center main groove 320 are disposed in line in the tire axial direction. The second inclined portion 310b of the center main groove 310 and the first inclined portion 320a of the center main groove 320 are disposed in line in the tire axial direction. Accordingly, excellent traction performance is obtained.

The width of the center main grooves 30 can be variously determined according to convention. For example, in the tire of the embodiment, the width of the center main grooves 30 is desirably 4.0%-8.5% of the tread ground width TW. The depth of the center main grooves 30 can be variously determined according to convention. For example, in the tire of the embodiment, the depth of the center main grooves 30 is, for example, desirably 8-15 mm. However, the dimension of each center main groove 30 is not limited to this range.

The crown blocks 100 are partitioned by transverse grooves 510, 520 that connect the center main grooves 310 and the center main grooves 320.

Figure 6:
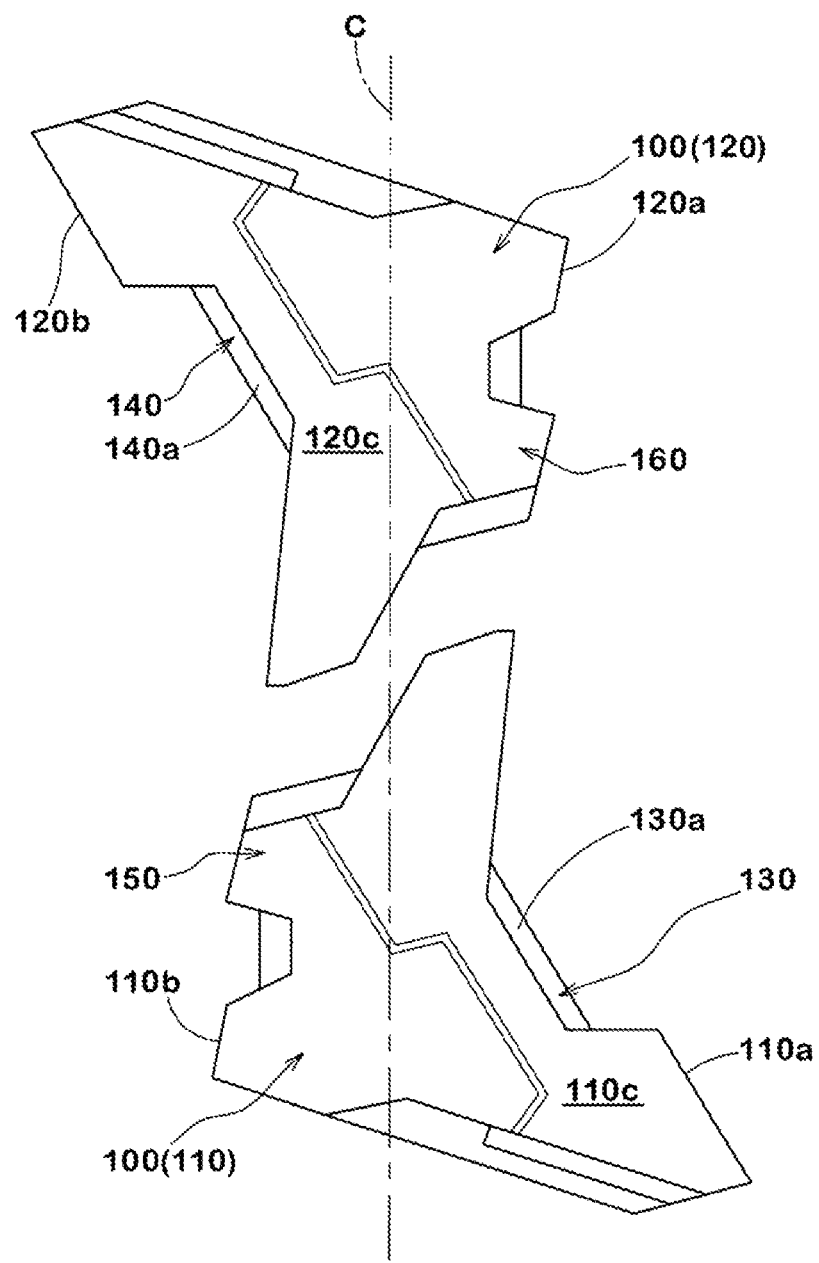
FIG. 6 is a developed view in which a crown block of FIG. 1 is enlarged.

FIG. 6 shows two adjacent crown blocks 100 arranged in the tire circumferential direction. The crown blocks 100 include a first crown block 110. The first crown block 110 has a first internal corner portion 130 formed at an outer end edge 110a on one side (right side in FIG. 6) in the tire axial direction and a first external corner portion 150 formed at an outer end edge 110b on the other side (left side in FIG. 6) in the tire axial direction.

The first internal corner portion 130 is a part where the outer end edge 110a is concave to the inner side in the tire axial direction, that is, a part where the outer end edge 110a of the first crown block 110 enters curvedly. The first external corner portion 150 is a part where the outer end edge 110b is convex to the outer side in the tire axial direction, that is, a part where the outer end edge 110b of the first crown block 110 projects in a cape shape. The first crown block 110 has the first internal corner portion 130 and the first external corner portion 150, and thereby a scratch effect at the outer end edges 110a, 110b increases, and the traction performance of the tire is improved.

Figure 7:
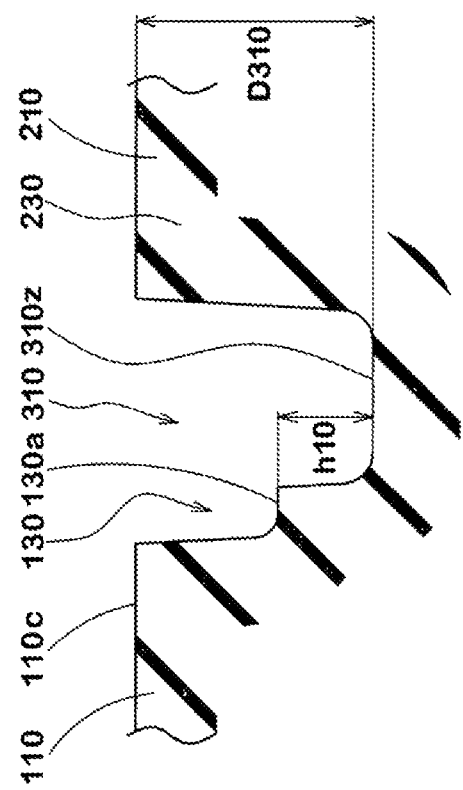
FIG. 7 is a cross-sectional view from a first internal corner portion to a first external corner portion of FIG. 1.

FIG. 7 shows a part of the cross section of the tread portion 2 including the first internal corner portion 130. In the first internal corner portion 130, a first stepped region 130a in which the height decreases in step from the block tread 110c toward a groove bottom 310z of the center main groove 310 is arranged. The first stepped region 130a of the embodiment linearly extends along the bottom of the first internal corner portion 130 (see FIG. 6). The bottom of the first internal corner portion 130 is, in FIG. 6, the deepest part of the first internal corner portion 130 (the same applies to the bottom described later).

By arranging the first stepped region 130a in the first internal corner portion 130, the invasion of stones into the first internal corner portion 130 is blocked, and the occurrence of stone biting in the first internal corner portion 130 is suppressed. In addition, the rigidity of the first crown block 110 is improved by the first stepped region 130a, and thus stones biting into the first internal corner portion 130 are easily eliminated. Therefore, according to the tire of the disclosure, the traction performance can be improved and the stone biting can be reduced.

The step number of the first stepped region 130a of the embodiment is one. Accordingly, the traction performance of the tire is easily improved. The step number of the first stepped region 130a may also be two or more. In this case, the invasion of stones with different sizes into the first internal corner portion 130 is blocked, and the stone biting in the first internal corner portion 130 is further suppressed.

A height h10 of one step of the first stepped region 130a from the groove bottom 310z of the center main groove 310 is, for example, desirably 30%-50% of a maximum groove depth D310 of the center main groove 310.

By the height h10 being 30% or more of the maximum groove depth D310, the stone biting in the first internal corner portion 130 is easily suppressed. In addition, rigidity of the first crown block 110 is increased, and the anti-wear performance is improved. By the height h10 being 50% or less of the maximum groove depth D310, the volume of the center main groove 310 increases, particularly, the traction performance of the tire on a snow road surface or off-road road surface can be easily improved.

As shown in FIG. 1 and FIG. 6, the crown block 100 of the embodiment includes a second crown block 120. The first crown block 110 and the second crown block 120 are arranged alternately and repeatedly in the tire circumferential direction.

The second crown block 120 of the embodiment has a shape symmetrical to the first middle block 110 with respect to a point on the tire equator C. The second crown block 120 has a second internal corner portion 140 formed at an outer end edge 120b on the other side in the tire axial direction and a second external corner portion 160 formed at an outer end edge 120a on one side in the tire axial direction.

The second internal corner portion 140 is a part where the outer end edge 120b is concave to the inner side in the tire axial direction, that is, a part where the outer end edge 120b of the second crown block 120 enters curvedly. The second external corner portion 160 is a part where the outer end edge 120a is convex to the outer side of the tire axial direction, that is, a part where the outer end edge 120a of the second crown block 120 projects in a cape shape. The second crown block 120 has the second internal corner portion 140 and the second external corner portion 160, and thereby a scratch effect at the outer end edges 120b, 120a increases, and the traction performance of the tire is improved.

Similar to the first internal corner portion 130, a second stepped region 140a in which the height decreases in step from the block tread 120c toward the groove bottom of the center main groove 320 is arranged in the second internal corner portion 140. The second stepped region 140a of the embodiment linearly extends along the bottom of the second internal corner portion 140. By arranging the second stepped region 140a in the second internal corner portion 140, the invasion of stones into the second internal corner portion 140 is blocked, and the occurrence of stone biting in the second internal corner portion 140 is suppressed. In addition, the rigidity of the second crown block 120 is improved by the second stepped region 140a, and thus stones biting into the second internal corner portion 140 are easily eliminated. Accordingly, the traction performance can be improved and the stone biting can be reduced.

Similar to the first stepped region 130a, the step number of the second stepped region 140a is one. The step number of the second stepped region 140a may also be two or more. In this case, the stone biting in the second internal corner portion 140 is further suppressed.

In addition, similar to the first stepped region 130a, the height of one step of the second stepped region 140a from the groove bottom of the center main groove 320 is, for example, desirably 30%-50% of the maximum groove depth of the center main groove 320.

As shown in FIG. 1, in the tread portion 2, a plurality of middle blocks 200 are formed outside of the respective center main grooves 30 in the tire axial direction. The middle blocks 200 are formed between the center main grooves 30 and the shoulder main grooves 4. The shoulder main grooves 4 are disposed between each center main groove 30 and each tread ground end TE. The middle blocks 200 are partitioned by transverse grooves 530 that connects the center main grooves 30 and the shoulder main grooves 4.

The middle block 200 has a longitudinal shape in which the length in the tire circumferential direction is larger than the length in the tire axial direction. The middle block 200 suppresses the stone biting between the center main groove 30 and the shoulder main groove 4, and contributes to improvement of the traction performance of the tire. The middle block 200 is bent to be convex toward the tire equator C side. Accordingly, the traction performance of the tire is easily improved.

The middle blocks 200 include a first middle block 210 disposed on one side of the crown blocks 100 in the tire axial direction.

Figure 8:
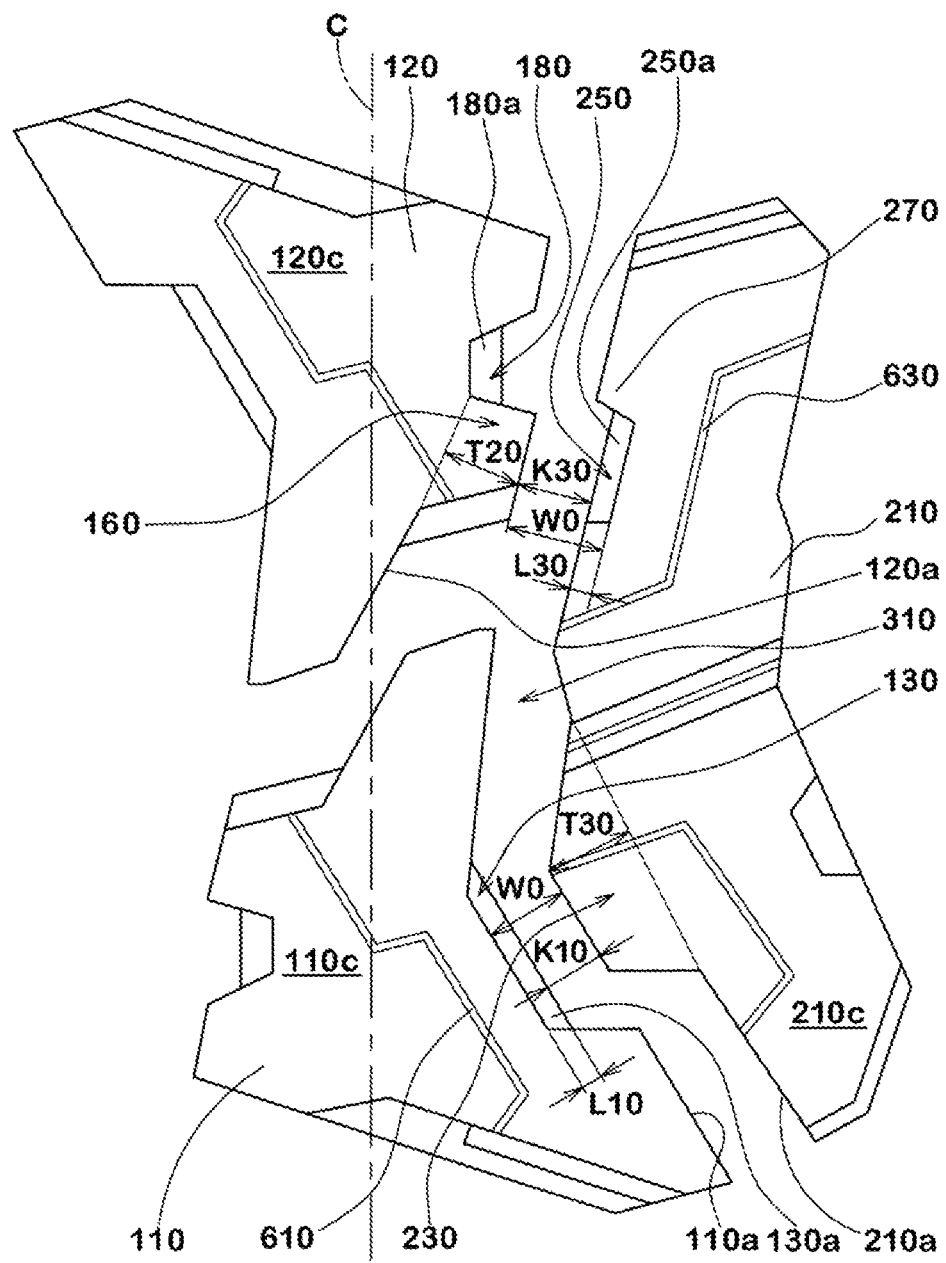
FIG. 8 is a developed view in which the crown block and a first middle block of FIG. 1 are enlarged.

FIG. 8 shows the first middle block 210 along with a part of the first crown block 110 and the second crown block 120. The first middle block 210 has a third external corner portion 230 and a third internal corner portion 250 at an inner end edge 210a in the tire axial direction.

The third external corner portion 230 is a part where the inner end edge 210a is convex to the inner side in the tire axial direction, that is, a part where the inner end edge 210a of the first middle block 210 projects in a cape shape. The third external corner portion 230 is disposed in a position facing the first internal corner portion 130 with the center main groove 310 interposed therebetween. The third internal corner portion 250 is a part where the inner end edge 210a is concave to the outer side in the tire axial direction, that is, a part where the inner end edge 210a of the first middle block 210 enters curvedly. The third internal corner portion 250 is disposed in a position facing the second external corner portion 160 with the center main groove 310 interposed therebetween. The first middle block 210 has the third external corner portion 230 and the third internal corner portion 250, and thereby a scratch effect at the end edge 210a increases, and the traction performance of the tire is improved.

Figure 9:
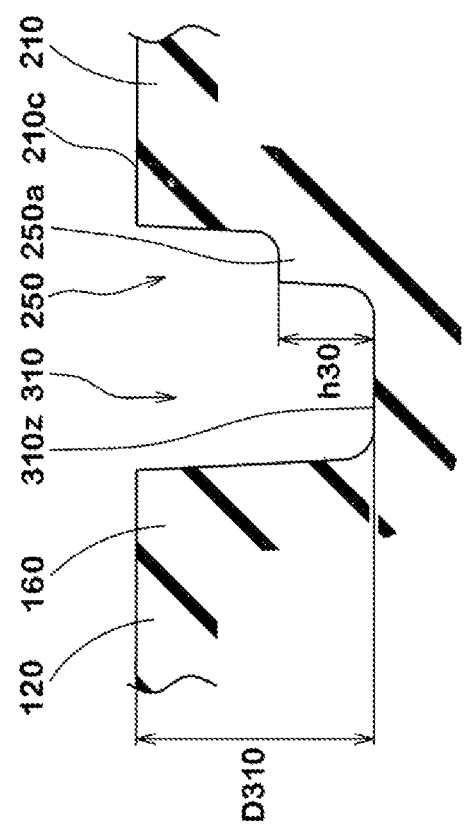
FIG. 9 is a cross-sectional view from a third internal corner portion to a second external corner portion of FIG. 8.

FIG. 9 shows a cross section of the third internal corner portion 250. In the third internal corner portion 250, a third stepped region 250a in which the height decreases in step from the block tread 210c toward the groove bottom 310z of the center main groove 310 is arranged. The third stepped region 250a of the embodiment linearly extends along the bottom of the third internal corner portion 250.

By arranging the third stepped region 250a in the third internal corner portion 250, the invasion of stones into the third internal corner portion 250 is blocked, and the occurrence of stone biting in the third internal corner portion 250 is suppressed. In addition, the rigidity of the first middle block 210 is improved by the third stepped region 250a, and thus stones biting into the third internal corner portion 250 are easily eliminated. Accordingly, the traction performance of the tire can be improved and the stone biting can be reduced.

The step number of the third stepped region 250a of the embodiment is one. Accordingly, the traction performance of the tire is easily improved. The step number of the third stepped region 250a may also be two or more. In this case, the invasion of stones with different sizes into the third internal corner portion 250 is blocked, and the stone biting in the third internal corner portion 250 is further suppressed.

A height h30 of one step of the third stepped region 250a from the groove bottom 310z of the center main groove 310 is, for example, desirably 30%-50% of the maximum groove depth D310 of the center main groove 310.

By the height h30 being 30% or more of the maximum groove depth D310, the stone biting in the third internal corner portion 250 is easily suppressed. In addition, the rigidity of the first middle block 210 is increased, and the anti-wear performance is improved. By the height h30 being 50% or less of the maximum groove depth D310, particularly, the volume of the center main groove 310 increases, and the traction performance of the tire on a snow road surface or off-road road surface can be easily improved.

As shown in FIG. 1, the middle blocks 200 of the embodiment include a second middle block 220. The second middle block 220 of the embodiment has a shape symmetrical to the first middle block 210 with respect to a point on the tire equator C.

Figure 10:
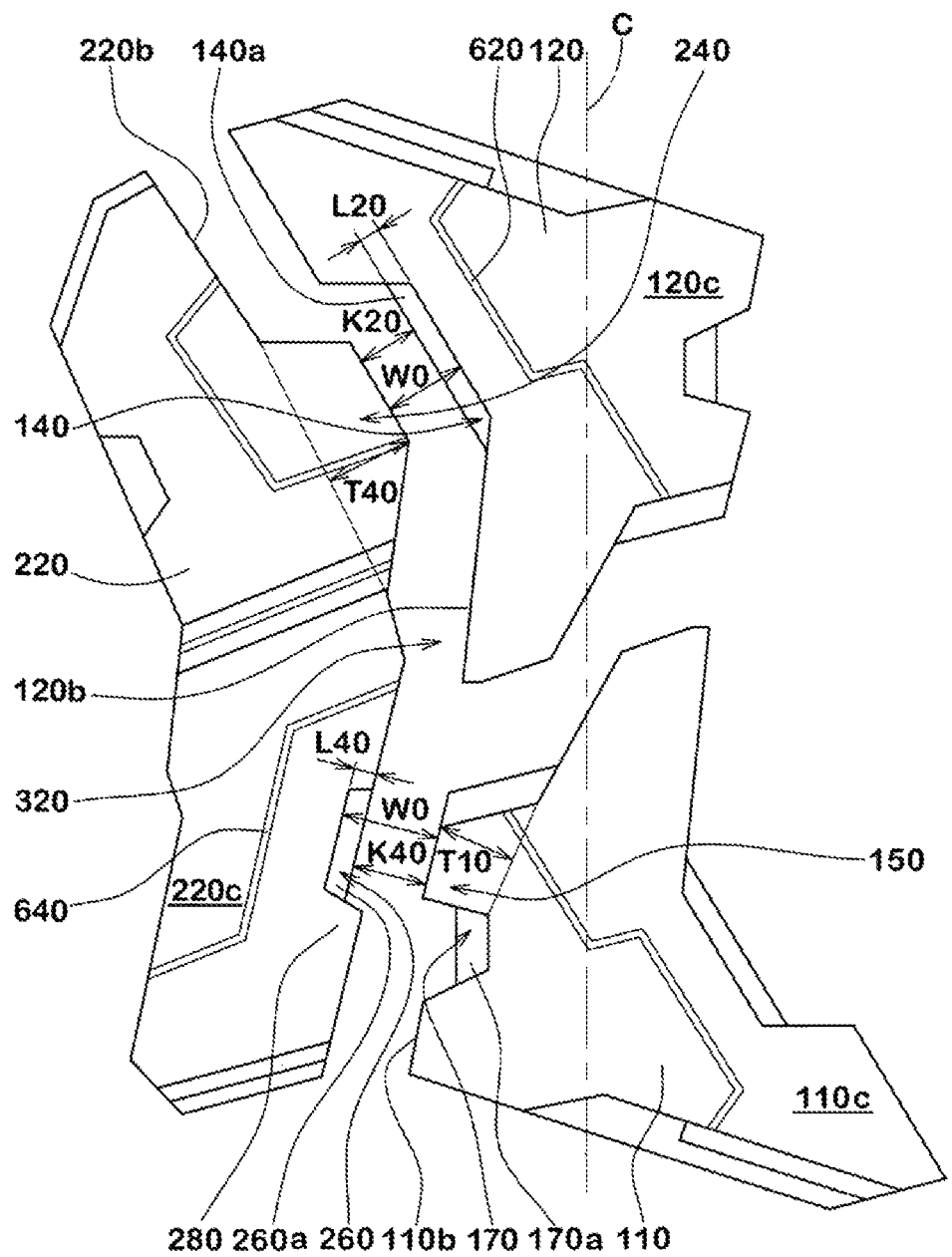
FIG. 10 is a developed view in which the crown block and a second middle block of FIG. 1 are enlarged.

FIG. 10 shows the second middle block 220 along with a part of the first crown block 110 and the second crown block 120. The second middle block 220 has a fourth external corner portion 240 and a fourth internal corner portion 260 at an inner end edge 220b in the tire axial direction.

The fourth external corner portion 240 is a part where the inner end edge 220b is convex to the inner side in the tire axial direction, that is, a part where the inner end edge 220b of the second middle block 220 projects in a cape shape. The fourth external corner portion 240 is disposed in a position facing the second internal corner portion 140 with the center main groove 320 interposed therebetween. The fourth internal corner portion 260 is a part where the inner end edge 220b is concave to the outer side in the tire axial direction, that is, a part where the inner end edge 220b of the second middle block 220 enters curvedly. The fourth internal corner portion 260 is disposed in a position facing the first external corner portion 150 with the center main groove 320 interposed therebetween. The second middle block 220 has the fourth external corner portion 240 and the fourth internal corner portion 260, and thereby a scratch effect at the end edge 220b increases, and the traction performance of the tire is improved.

Similar to the third internal corner portion 250, a fourth stepped region 260a in which the height decreases in step from the block tread 220c toward the groove bottom of the center main groove 320 is arranged in the fourth internal corner portion 260. The fourth stepped region 260a of the embodiment linearly extends along the bottom of the fourth internal corner portion 260. By arranging the fourth stepped region 260a in the fourth internal corner portion 260, the invasion of stones into the fourth internal corner portion 260 is blocked, and the occurrence of stone biting in the fourth internal corner portion 260 is suppressed. In addition, the rigidity of the second middle block 220 is improved by the fourth stepped region 260a, and thus stones biting into the fourth internal corner portion 260 are easily eliminated. Accordingly, the traction performance can be improved and the stone biting can be reduced.

Similar to the third stepped region 250a, the step number of the fourth stepped region 260a is one. The step number of the fourth stepped region 260a may also be two or more. In this case, the stone biting in the fourth internal corner portion 260 is further suppressed.

In addition, similar to the third stepped region 250a, the height of one step of the fourth stepped region 260a from the groove bottom of the center main groove 320 is, for example, desirably 30%-50% of the maximum groove depth of the center main groove 320.

As shown in FIG. 8 and FIG. 10, in a region where the first internal corner portion 130 faces the third external corner portion 230, a length L10 of the first stepped region 130a in a direction orthogonal to the center main groove 310 is, for example, desirably 10%-30% of a width W0 of the center main groove 310.

By the length L10 being 10% or more of the width W0, the stone biting in the first internal corner portion 130 is easily suppressed. In addition, the rigidity of the first crown block 110 is increased, and the anti-wear performance is improved. By the length L10 being 30% or less of the width W0, the volume of the center main groove 310 increases, particularly, the traction performance of the tire on a snow road surface or off-road road surface can be easily improved.

In a region where the second internal corner portion 140 faces the fourth external corner portion 240, a length L20 of the second stepped region 140a in a direction orthogonal to the center main groove 320 is, for example, desirably 10%-30% of the width W0 of the center main groove 320. The reason why the length L20 is desirably in the range is the same as the reason why the length L10 is desirably in the above range.

In a region where the third internal corner portion 250 faces the second external corner portion 160, a length L30 of the third stepped region 250a in a direction orthogonal to the center main groove 310 is, for example, desirably 10%-30% of the width W0 of the center main groove 310.

By the length L30 being 10% or more of the width W0, the stone biting in the third internal corner portion 250 is easily suppressed. In addition, the rigidity of the first middle block 210 is increased, and the anti-wear performance is improved. By the length L30 being 30% or less of the width W0, the volume of the center main groove 310 increases, particularly, the traction performance of the tire on a snow road surface or off-road road surface can be easily improved.

In a region where the fourth internal corner portion 260 faces the first external corner portion 150, a length L40 of the fourth stepped region 260a in a direction orthogonal to the center main groove 320 is desirably 10%-30% of the width W0 of the center main groove 320. The reason why the length L40 is desirably in the range is the same as the reason why the length L30 is desirably in the above range.

A distance K10 between the third external corner portion 230 and the first stepped region 130a is, for example, desirably 70%-90% of the width W0 of the center main groove 310 in the region where the first internal corner portion 130 faces the third external corner portion 230.

By the distance K10 being 70% or more of the width W0, the volume of the center main groove 310 increases, particularly, the traction performance of the tire on a snow road surface or off-road road surface can be easily improved. By the distance K10 being 90% or less of the width W0, the stone biting in the first internal corner portion 130 is easily suppressed. In addition, the rigidity of the first crown block 110 is increased, and the anti-wear performance is improved.

A distance K20 between the fourth external corner portion 240 and the second stepped region 140a is, for example, desirably 70%-90% of the width W0 of the center main groove 320 in the region where the second internal corner portion 140 faces the fourth external corner portion 240. The reason why the distance K20 is desirably in the range is the same as the reason why the distance K10 is desirably in the above range.

A distance K30 between the second external corner portion 160 and the third stepped region 250a is, for example, desirably 70%-90% of the width W0 of the center main groove 310 in the region where the third internal corner portion 250 faces the second external corner portion 160.

By the distance K30 being 70% or more of the width W0, the volume of the center main groove 310 increases, particularly, the traction performance of the tire on a snow road surface or off-road road surface can be easily improved. By the distance K30 being 90% or less of the width W0, the stone biting in the third internal corner portion 250 is easily suppressed. In addition, the rigidity of the first middle block 210 is increased, and the anti-wear performance is improved.

A distance K40 between the first external corner portion 150 and the fourth stepped region 260a is, for example, desirably 70%-90% of the width W0 of the center main groove 320 in the region where the fourth internal corner portion 260 faces the first external corner portion 150. The reason why the distance K40 is desirably in the range is the same as the reason why the distance K30 is desirably in the above range.

A projection amount T10 of the first external corner portion 150 is, for example, desirably 80%-110% of the width W0 of the center main groove 320 in the region where the fourth internal corner portion 260 faces the first external corner portion 150.

By the projection amount T10 being 80% or more of the width W0, particularly the traction performance of the tire on a snow road surface or off-road road surface can be easily improved. By the projection amount T10 being 110% or less of the width W0, the stone biting in the fourth internal corner portion 260 is easily suppressed. In addition, partial reduction in the rigidity of the first crown block 110 in the first external corner portion 150 is suppressed, and the anti-wear performance is improved.

A projection amount T20 of the second external corner portion 160 is, for example, desirably 80%-110% of the width W0 of the center main groove 310 in the region where the third internal corner portion 250 faces the second external corner portion 160. The reason why the projection amount T20 is desirably in the range is the same as the reason why the projection amount T10 is desirably in the above range.

A projection amount T30 of the third external corner portion 230 is, for example, desirably 80%-110% of the width W0 of the center main groove 310 in the region where the first internal corner portion 130 faces the third external corner portion 230.

By the projection amount T30 being 80% or more of the width W0, particularly the traction performance of the tire on a snow road surface or off-road road surface can be easily improved. By the projection amount T30 being 110% or less of the width W0, the stone biting in the first internal corner portion 130 is easily suppressed. In addition, partial reduction in the rigidity of the first middle block 210 in the third external corner portion 230 is suppressed, and the anti-wear performance is improved.

A projection amount T40 of the fourth external corner portion 240 is, for example, desirably 80%-110% of the width W0 of the center main groove 320 in the region where the second internal corner portion 140 faces the fourth external corner portion 240. The reason why the projection amount T40 is desirably in the range is the same as the reason why the projection amount T30 is desirably in the above range.

In the embodiment, the first internal corner portion 130 and the third external corner portion 230 are arranged in the first inclined portion 310a of the center main groove 310, and the third internal corner portion 250 and the second external corner portion 160 are arranged in the second inclined portion 310b of the center main groove 310. Accordingly, the first internal corner portion 130, the third external corner portion 230, the third internal corner portion 250, and the second external corner portion 160 are uniformly disposed in the tire circumferential direction, and the traction performance of the tire is improved.

Similarly, the second internal corner portion 140 and the fourth external corner portion 240 are arranged in the first inclined portion 320a of the center main groove 320, and the fourth internal corner portion 260 and the first external corner portion 150 are arranged in the second inclined portion 320b of the center main groove 320. Accordingly, the second internal corner portion 140, the fourth external corner portion 240, the fourth internal corner portion 260, and the first external corner portion 150 are uniformly disposed in the tire circumferential direction, and the traction performance of the tire is improved.

In the tread portion 2 of the embodiment, a fifth internal corner portion 170 may be arranged at the outer end edge 110b of the first crown block 110, and a sixth internal corner portion 180 may be arranged at the outer end edge 120a of the second crown block 120. The fifth internal corner portion 170 is a part where the outer end edge 110b is concave to the inner side in the tire axial direction, and the sixth internal corner portion 180 is a part where the outer end edge 120a is concave to the inner side in the tire axial direction.

In this case, desirably, a fifth external corner portion 270 is arranged at the inner end edge 210a of the first middle block 210, and a sixth external corner portion 280 is arranged at the inner end edge 220b of the second middle block 220. The fifth external corner portion 270 is a part where the end edge 210a is convex to the inner side in the tire axial direction, and the sixth external corner portion 280 is a part where the end edge 220b is convex to the inner side in the tire axial direction.

In the embodiment, the fifth internal corner portion 170 and the sixth external corner portion 280 face each other with the center main groove 320 interposed therebetween, and the sixth internal corner portion 180 and the fifth external corner portion 270 face each other with the center main groove 310 interposed therebetween. By arranging the fifth internal corner portion 170, the sixth internal corner portion 180, the fifth external corner portion 270, and the sixth external corner portion 280, the scratch effect at the outer end edges 110b, 120a and the end edges 210a, 220b increases, and the traction performance of the tire is improved.

Desirably, a fifth stepped region 170a in which the height decreases in step from the block tread 110c toward the groove bottom of the center main groove 320 is arranged in the fifth internal corner portion 170, and a sixth stepped region 180a in which the height decreases in step from the block tread 120c toward the groove bottom 310z of the center main groove 310 is arranged in the sixth internal corner portion 180. By arranging the fifth stepped region 170a and the sixth stepped region 180a, the stone biting in the fifth internal corner portion 170 and the sixth internal corner portion 180 is suppressed.

A first narrow groove 610 may be arranged in the first crown block 110. The width of the first narrow groove 610 is, for example, 1.5 mm or less (the same applies to a second narrow groove 620, a third narrow groove 630, and a fourth narrow groove 640 described later). The first narrow groove 610 has a part linearly extending in parallel with the first stepped region 130a. Due to this first narrow groove 610, the traction performance of the tire is improved.

A second narrow groove 620 may be arranged in the second crown block 120. The second narrow groove 620 has a part linearly extending in parallel with the second stepped region 140a. Due to this second narrow groove 620, the traction performance of the tire is improved.

A third narrow groove 630 may be arranged in the first middle block 210. The third narrow groove 630 has a part linearly extending in parallel with the third stepped region 250a. Due to this third narrow groove 630, the traction performance of the tire is improved.

A fourth narrow groove 640 may be arranged in the second middle block 220. The fourth narrow groove 640 has a part linearly extending in parallel with the fourth stepped region 260*a*. Due to this fourth narrow groove 640, the traction performance of the tire is improved.

What is claimed is:

1. A tire, comprising a tread portion,
wherein the tread portion comprises: a pair of shoulder main grooves which is disposed to continuously extend on the sides closest to tread ground ends in a tire circumferential direction and clamp a tire equator, a crown region between the pair of shoulder main grooves, and shoulder regions disposed outside of the shoulder main grooves in a tire axial direction;
land ratios of the crown region and the shoulder regions are respectively 40%-60%;
in the crown region, a plurality of middle blocks are arranged on both sides of the tire equator; and
each of the plurality of middle blocks has a longitudinal shape in which a length L2 in the tire circumferential direction is larger than a length L1 in the tire axial direction,
wherein in the crown region, a plurality of crown blocks are arranged between the middle blocks,
wherein the plurality of crown blocks are disposed on the tire equator so that each of the plurality of crown blocks is located on both sides of the tire equator,
wherein a pair of the crown blocks is disposed between a pair of the middle blocks adjacent in the tire axial direction,
wherein a number of the plurality of the crown blocks and a number of the plurality of the middle blocks is a same number,
wherein the plurality of middle blocks are respectively lined up in the tire circumferential direction via a plurality of middle transverse grooves,
wherein a pair of center main grooves are disposed on both sides of the tire equator and continuously extending in a zigzag shape in the tire circumferential direction, and the plurality of crown blocks partitioned between the pair of center main grooves are formed in the tread portion;
the plurality of crown blocks comprises a first crown block having a first internal corner portion in which an outer end edge on one side in the tire axial direction is concave to the inner side in the tire axial direction, and a first external corner portion in which an outer end edge on the other side in the tire axial direction is convex to the outer side in the tire axial direction; and
a first stepped region having at least one step in which the height decreases in step from the block tread toward the groove bottom of the center main groove is arranged in the first internal corner portion.

2. The tire according to claim 1, wherein a ratio L2/L1 of the length L2 to the length L1 of each of the plurality of middle blocks is 2.0-4.0.

3. The tire according to claim 1, wherein
a shallow groove crossing each of the plurality of middle blocks is formed in each of the plurality of middle blocks; and
the shallow groove is smaller in depth than the plurality of middle transverse grooves.

4. The tire according to claim 3, wherein a depth of the shallow groove is 40%-60% of a depth of the plurality of middle transverse grooves.

5. The tire according to claim 3, wherein a groove width of the shallow groove is 4%-6% of the length L2 of each of the plurality of middle blocks in the tire circumferential direction.

6. The tire according to claim 3, wherein a groove bottom sipe extending along the shallow groove is arranged at the groove bottom of the shallow groove.

7. The tire according to claim 6, wherein a depth of the groove bottom sipe is 40%-60% of the depth of the shallow groove.

8. The tire according to claim 3, wherein at least one of two end surfaces of each of the plurality of middle blocks located at both ends in the tire circumferential direction has a stepped portion in which the height decreases in step from a block tread toward the groove bottom of the plurality of middle transverse grooves.

9. The tire according to claim 8, wherein the stepped portion has two step portions between the block tread and the groove bottom of the plurality of middle transverse grooves.

10. The tire according to claim 1, wherein a ratio L4/L3 of a length L4 of each of the plurality of crown blocks in the tire circumferential direction to a length L3 of each of the plurality of crown blocks in the tire axial direction is 0.85-1.15.

11. The tire according to claim 1, wherein the plurality of crown blocks comprises a second crown block having a second internal corner portion in which the outer end edge on one side in the tire axial direction is concave to the inner side in the tire axial direction, and a second external corner portion in which the outer end edge on the other side in the tire axial direction is convex to the outer side in the tire axial direction; and
a second stepped region having at least one step in which the height decreases in step from the block tread toward the groove bottom of the center main groove is arranged in the second internal corner portion.

12. The tire according to claim 11, wherein the step number of the first stepped region and the second stepped region is one.

13. The tire according to claim 12, wherein the height of one step of the first stepped region and the second stepped region from the groove bottom of the center main groove is 30%-50% of the maximum groove depth of the center main groove.

14. The tire according to claim 11, wherein the plurality of middle blocks are formed outside of the pair of center main grooves respectively in the tire axial direction in the tread portion;
the plurality of middle blocks comprises a first middle block having a third external corner portion in which the inner end edge in the tire axial direction is convex to the inner side in the tire axial direction in a position facing the first internal corner portion with the center main groove interposed therebetween, and a third internal corner portion in which the inner end edge in the tire axial direction is concave to the outer side in the tire axial direction in a position facing the second external corner portion with the center main groove interposed therebetween; and
a third stepped region having at least one step in which the height decreases in step from the block tread toward the groove bottom of the center main groove is arranged in the third internal corner portion.

15. The tire according to claim 14, wherein the plurality of middle blocks comprises a second middle block having a fourth external corner portion in which the inner end edge in the tire axial direction is convex to the inner side in the tire axial direction in a position facing the second internal corner portion with the center main groove interposed therebetween, and a fourth internal corner portion in which the inner end edge in the tire axial direction is concave to the outer side in the tire axial direction in a position facing the first external corner portion with the center main groove interposed therebetween; and
- a fourth stepped region having at least one step in which the height decreases in step from the block tread toward the groove bottom of the center main groove is arranged in the fourth internal corner portion.

16. The tire according to claim 15, wherein the step number of the third stepped region and the fourth stepped region is one.

17. The tire according to claim 16, wherein the height of one step of the third stepped region and the fourth stepped region from the groove bottom of the center main groove is 30%-50% of the maximum groove depth of the center main groove.

18. A tire, comprising a tread portion,
- wherein the tread portion comprises: a pair of shoulder main grooves which is disposed to continuously extend on the sides closest to tread ground ends in a tire circumferential direction and clamp a tire equator, a crown region between the pair of shoulder main grooves, and shoulder regions disposed outside of the shoulder main grooves in a tire axial direction;
- land ratios of the crown region and the shoulder regions are respectively 40%-60%;
- in the crown region, a plurality of middle blocks are arranged on both sides of the tire equator; and
- each of the plurality of middle blocks has a longitudinal shape in which a length L2 in the tire circumferential direction is larger than a length L1 in the tire axial direction,
- wherein in the crown region, a plurality of crown blocks are arranged between the middle blocks,
- wherein the plurality of crown blocks are disposed on the tire equator so that each of the plurality of crown blocks is located on both sides of the tire equator,
- wherein a pair of the crown blocks is disposed between a pair of the middle blocks adjacent in the tire axial direction,
- wherein a number of the plurality of the crown blocks and a number of the plurality of the middle blocks is a same number,
- wherein a pair of center main grooves are disposed on both sides of the tire equator and continuously extending in a zigzag shape in the tire circumferential direction, and the plurality of crown blocks partitioned between the pair of center main grooves are formed in the tread portion,
- the plurality of crown blocks comprises a first crown block having a first internal corner portion in which an outer end edge on one side in the tire axial direction is concave to the inner side in the tire axial direction, and a first external corner portion in which an outer end edge on the other side in the tire axial direction is convex to the outer side in the tire axial direction; and
- a first stepped region having at least one step in which the height decreases in step from the block tread toward the groove bottom of the center main groove is arranged in the first internal corner portion.

19. A tire, comprising a tread portion,
- wherein the tread portion comprises: a pair of shoulder main grooves which is disposed to continuously extend on the sides closest to tread ground ends in a tire circumferential direction and clamp a tire equator, a crown region between the pair of shoulder main grooves, and shoulder regions disposed outside of the shoulder main grooves in a tire axial direction;
- land ratios of the crown region and the shoulder regions are respectively 40%-60%;
- in the crown region, a plurality of middle blocks are arranged on both sides of the tire equator; and
- each of the plurality of middle blocks has a longitudinal shape in which a length L2 in the tire circumferential direction is larger than a length L1 in the tire axial direction,
- wherein in the crown region, a plurality of crown blocks are arranged between the middle blocks,
- wherein the plurality of crown blocks are disposed on the tire equator so that each of the plurality of crown blocks is located on both sides of the tire equator,
- wherein a pair of the crown blocks is disposed between a pair of the middle blocks adjacent in the tire axial direction,
- wherein a number of the plurality of the crown blocks and a number of the plurality of the middle blocks is a same number,
- wherein a pair of center main grooves are disposed on both sides of the tire equator and continuously extending in a zigzag shape in the tire circumferential direction, and the plurality of crown blocks partitioned between the pair of center main grooves are formed in the tread portion,
- the plurality of crown blocks comprises a first crown block having a first internal corner portion in which an outer end edge on one side in the tire axial direction is concave to the inner side in the tire axial direction, and a first external corner portion in which an outer end edge on the other side in the tire axial direction is convex to the outer side in the tire axial direction, and
- a first stepped region having at least one step in which the height decreases in step from the block tread toward the groove bottom of the center main groove is arranged in the first internal corner portion,
- wherein the plurality of middle blocks are formed outside of the pair of center main grooves respectively in the tire axial direction in the tread portion.

\* \* \* \* \*